April 20, 1965    R. J. ROSA    3,179,873
MAGNETOHYDRODYNAMIC EQUIPMENT FOR PRODUCING A.C. POWER
Filed April 29, 1960    2 Sheets-Sheet 1
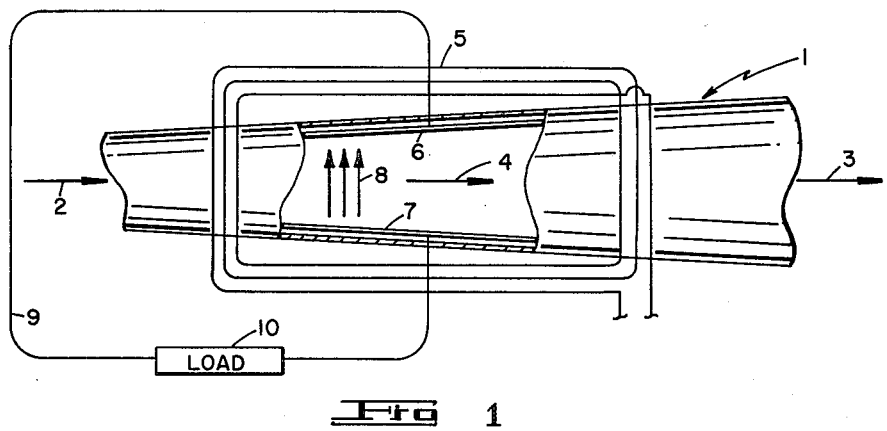
Fig 1
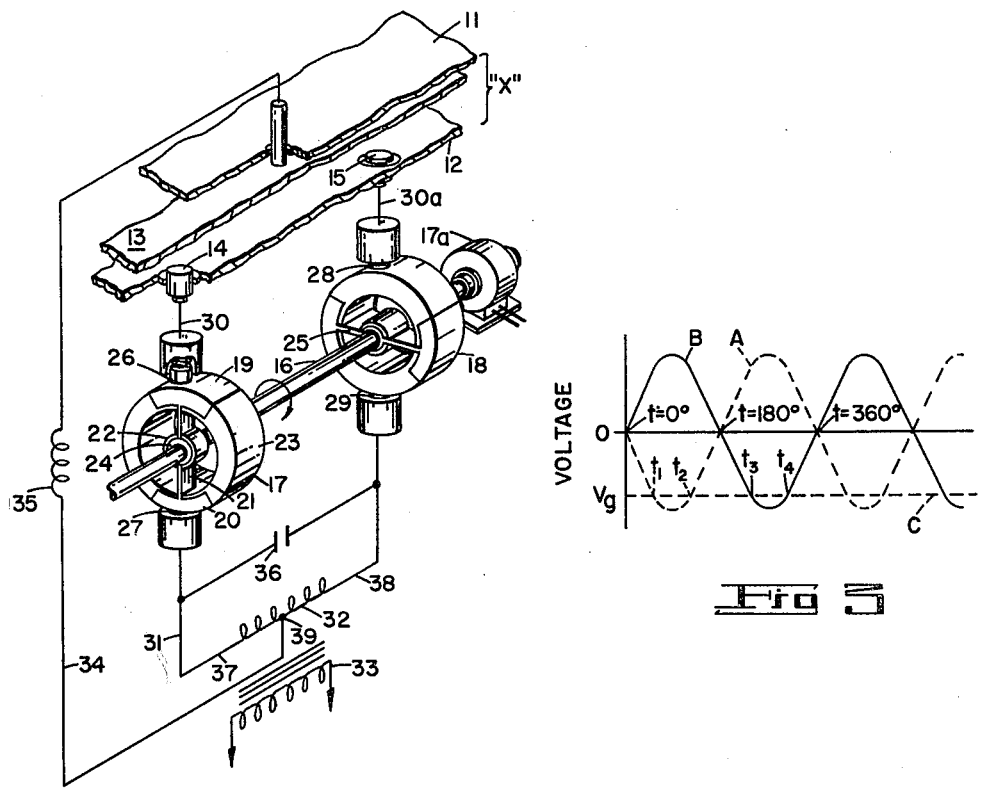
Fig 2
Fig 5
RICHARD J. ROSA
INVENTOR.
BY Alden D. Redfield
Warren Kuntz
ATTORNEYS

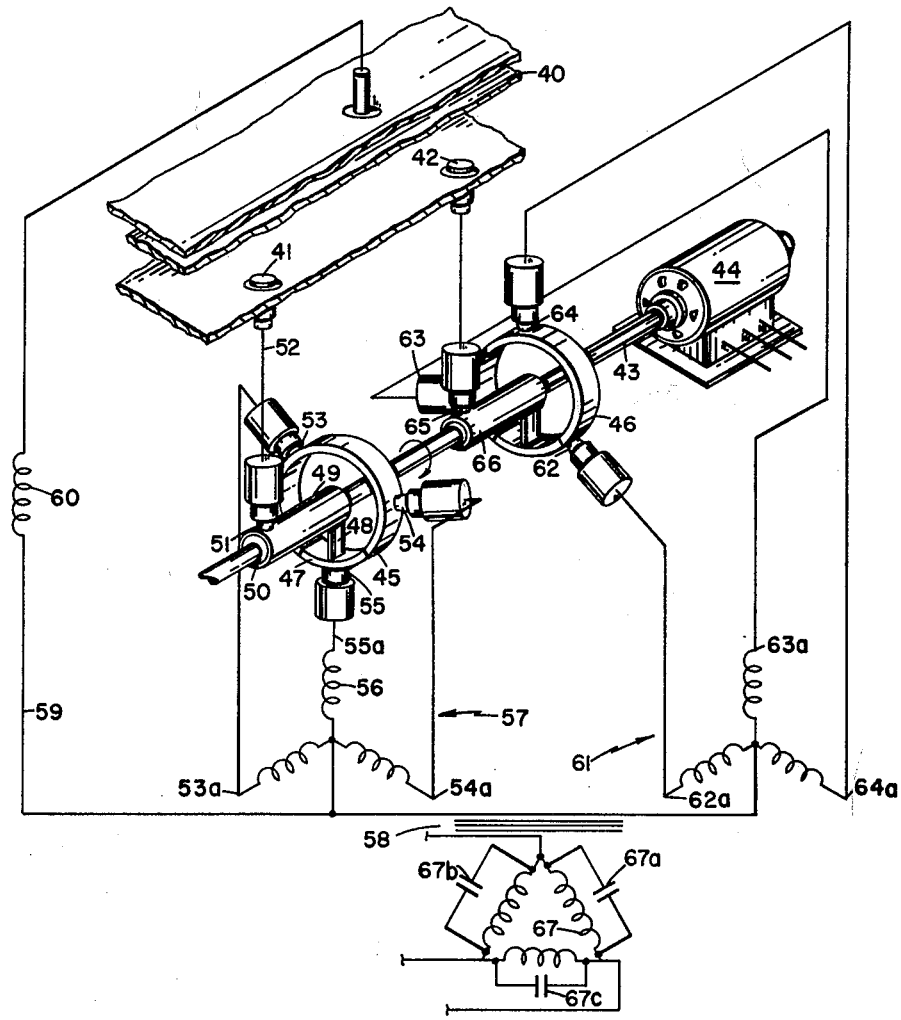
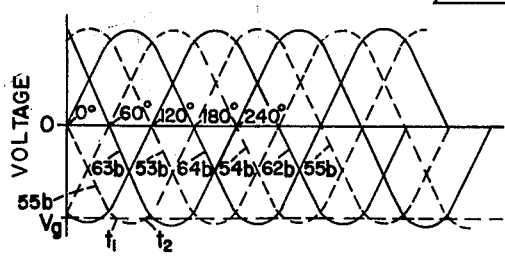

United States Patent Office 3,179,873
Patented Apr. 20, 1965

3,179,873
MAGNETOHYDRODYNAMIC EQUIPMENT
FOR PRODUCING A.C. POWER
Richard J. Rosa, Reading, Mass., assignor to Avco Corporation, Cincinnati, Ohio, a corporation of Delaware
Filed Apr. 29, 1960, Ser. No. 25,728
14 Claims. (Cl. 322—2)

The present invention relates to electric power generating equipment and particularly to a magnetohydrodynamic (hereinafter referred to as "MHD") generator and associated equipment that is adapted to produce alternating current electric power. More specifically still, the invention relates to power generating equipment employing an MHD generator and switch mechanisms for producing single phase or polyphase power.

Very keen interest exists today in MHD generators. Such generators produce electric power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source. Conductivity of the gas may be produced thermally, or by seeding the gas with a substance that ionizes readily at the operating temperature of the generator. For seeding purposes, sodium, potassium, cesium, or an alkali metal vapor may be used. Regardless of the gas used, or the manner of seeding, the resulting gases comprise a mixture of electrons, positive ions, and neutral atoms which, for convenience, may be termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current. In commercial installations recently proposed, the inversion equipment takes the form of mercury arc rectifiers. Although this is feasible, such inverters have a relatively high first cost and significant energy losses that penalize the over-all efficiency of the system. As a result, attention has been directed toward special designs of MHD generators and towards simplified auxiliary equipment that can cooperate with the generators whereby alternating current may be obtained in a more economical and facile manner.

The present invention comprises an MHD generator having pairs of discrete electrodes with which current flow can be alternately established by means of switches. In circuit with the switches are conventional circuit elements for developing an alternating current output. An important aspect of the invention is the inherent rectifying characteristic of the generator which prevents reverse current flow through the generator at the time of switch opening. This is of vital importance in preventing electrical erosion of switch contacts and serious energy losses that characterized earlier forms of mechanical inverters.

In view of the foregoing, it is an object of the present invention to provide an improved MHD generator installation for producing alternating current.

Another object of the invention is to provide in combination with an MHD generator switches capable of establishing alternating current flow through portions of an electrical circuit associated with the switches.

Another object of the invention is to take advantage of the inherent rectifying action of an MHD generator to prevent arcing at the switches associated with the generator.

A further object of the invention is to provide an MHD generator installation capable of producing polyphase as well as single phase current.

A still further object is the provision of an alternating current MHD power generating installation that is characterized by low initial cost and low operating losses.

The novel features that I consider characteristic of my invention are set forth in the appended claims; the invention, itself, however, both as to its organization and method of operation, together with additional objects and advantages thereof, will best be understood from the following description of specific embodiments when read in conjunction with the accompanying drawings, in which:

FIGURE 1 is a simplified diagrammatic illustration of an MHD generator;

FIGURE 2 is a fragmentary perspective view of portions of an MHD generator in operative association with mechanical switches for inverting the D.C. output of the generator to an A.C. output.

FIGURE 3 is a graphical representation of voltages in the installation shown in FIGURE 2;

FIGURE 4 is a fragmentary perspective view of portions of an MHD generator in association with mechanical switches and associated circuit elements for producing polyphase current; and FIGURE 5 is a graphical representation of the polyphase voltages in the installation of FIGURE 4.

A knowledge of the general principles of MHD generators will promote an understanding of the present invention. For this reason, there is shown in FIGURE 1 a schematic of an MHD generator. As illustrated in that figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and shape of the duct, the plasma can be made to move through the duct at substantially constant velocity, which is desirable although not necessary to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct perpendicular to the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a uni-directional E.M.F. between the electrodes, as indicated by the arrows at 8. The electrodes 6 and 7 are connected by conductor 9 to a load 10 through which electrical current flows under the influence of the E.M.F. induced between the electrodes.

From the foregoing description it will be immediately recognized that the MHD generator, as described, inherently produces a flow of direct current through the load. Although this is entirely satisfactory for many purposes, modern power transmission systems obviously require a generating installation capable of producing alternating current. Such a magnetohydrodynamic installation is shown in FIGURE 2, to which reference should be made at this time.

In FIGURE 2, fragments of the opposed walls of the generator duct are shown at 11 and 12. To make the drawing more compact, the distance "X" between these walls has been greatly reduced, although it should be understood that they are spaced relatively far apart as in the proportions shown in FIGURE 1.

The upper electrode within the duct is indicated at 13. In the novel structure of FIGURE 2, the lower electrode has been replaced by a series of discrete spaced electrodes, two of which are shown at 14 and 15, in cooperative relationship with switchgear and other elements, as will be described shortly. All of the electrodes are electrically insulated from the walls of the duct that support them.

The switchgear that cooperates with the MHD generator comprises a shaft 16 which may be driven at constant speed by motor 17a, the motor being speed regulated and energized in conventional manner. For purposes of illustration, it may be assumed that shaft 16 turns at constant speed in a clockwise direction as viewed from its left end.

Secured to the shaft for conjoint rotation therewith are a pair of switch rotors 17 and 18. Each rotor is generally similar in construction, and for this reason, a description of rotor 17 will suffice. The rotor includes a pair of opposed electrically conductive segments 19 and 20 which are joined through an integral web 21 and hub 22. These conductive members are molded integrally into a hard plastic material 23 forming with the conductive segments a cylindrical rotor as shown. An insulating bushing may be provided at 24 to electrically isolate the conductive portions of the rotor from the shaft. As will be explained more fully later in the application, each segment spans approximately 45° of the rotor periphery.

As has been mentioned, rotor 18 is similar in construction to rotor 17 but is attached to shaft 16 so that its web 25 is normal to web 21 of rotor 17. The significance of this structural arrangement will be appreciated when attention is called to brushes 26–27 and brushes 28–29 that are associated with rotors 17 and 18, respectively. Brush 26 is connected by conductor 30 to electrode 14 while brush 27 is connected by conductor 31 to one end of transformer primary 32, the secondary of the transformer being shown at 33. In similar fashion, brush 28 is connected by conductor 30a to electrode 15 and brush 29 is connected to the other end of transformer primary 32. It will now be seen that during the time that segments 19 and 20 establish electrical connection between brushes 26 and 27, current flow between brushes 28 and 29 is interrupted by the interposition therebetween of the nonconducting portions of rotor 18. To assure good electrical contact between the brushes and the segments of the rotors, the brushes may be spring loaded, as shown in the broken away section of brush 26, in accordance with standard practice in commutator brush manufacture.

It will be noted that a conductor 34, including an inductance 35, interconnects the center of transformer primary 32 with the electrode 13. A commutating capacitor 36 may be connected across the ends of transformer primary 32.

In general terms, the device of FIGURE 2 operates in the following manner: electrical conduction is established alternately between electrode 13 and each of the electrodes 14 and 15. The periods of conduction are determined generally by the switchgear, and more particularly, by the position of rotors 17 and 18. Under the control of the rotors, flow of current is established alternately and in opposite directions through the two halves of the transformer primary to conductor 34, inducing an alternating current output in the transformer secondary 33.

Use of mechanical switches for inversion purposes in itself is not new. Reference may be made to the Bedford et al. Patent 2,241,050 (1941) which shows switching equipment for inverting direct current to alternating current. The difficulty with mechanical inverters has been, however, that as each switch is opened to interrupt current flow in a particular associated circuit, severe arcing occurs. This not only rapidly erodes the switch contacts but constitutes a serious loss of power. As a result, elaborate arrangements of inductances and capacitors are common in the prior art to minimize the arcing. Such arrangements are not practical in a high power installation such as intended for central power station use.

Attention may now be directed to the inherent rectifying action of an MHD generator which, in connection with mechanical switches, makes possible the effective and economical production of A.C. power.

In the MHD generator of FIGURE 2, electrode 13 may be regarded as the cathode since it supplies electrons to the plasma stream to balance the flow of electrons from the plasma stream to the electrodes 14 and 15, which may be regarded as anodes. As far as the anodes are concerned, the ionized plasma stream itself appears as a cathode from which they accept electrons but to which they are unable to give electrons. Thus, the movement of electrons is necessarily from the stream to the anodes and not in a reverse direction and hence, an MHD generator is inherently a rectifier as far as alternating current flow between the electrodes is concerned. To prevent electron emission, the anodes are preferably cooled below emission temperature or protected by the relatively cool boundary layer of gases within the duct.

With further reference to FIGURE 2, it may be assumed that the switch rotors are in the instantaneous positions indicated. Under such circumstances, electron current will flow from the cathode 13 to the anode 14, through the switch rotor and through the left half of the transformer primary to conductor 34, which completes the circuit to the cathode. At the same time, flow of current from cathode 13 to anode 15 is prevented because the associated circuit is open-circuited by the swich rotor 18.

To promote an understanding of the novel device shown in FIGURE 2, assume the existence of an A.C. power network that causes the voltage waveforms A and B (see FIGURE 3) to appear at the transformer primary end terminals 37 and 38. By suitable choice of transformer turn ratio, and in accordance with usual inverter design, the peak value of this voltage is made to be greater than the designed D.C. output voltage of the MHD generator, designated as $V_g$ in FIG. 3. In FIG. 3 the voltages are drawn choosing the voltage of the center tap 39 of the transformer as zero. The voltage of the generator cathode 13 will also be approximately zero except for effects introduced by the inductor 35 which will be discussed later. Again neglecting for the moment the effect of the inductor 35, the voltage of the gas stream immediately adjacent to the anodes 14 and 15 will be at the voltage $-V_g$, designated by line C in FIGURE 3.

The generator will feed energy into the power network through the transformer if it produces a pulse of electron current through the left side of the primary in the direction from 37 to 39 during some or all of the time in which 37 is negative with respect to 39, and a pulse of electron current from 38 to 39 during some or all of the time when 38 is negative with respect to 39. This again is in accordance with conventional inverter theory.

Thus, at time $t=0°$ rotor 17 completes its associated circuit and electron current flows from 37 to 39. At time $t_1$ this current stops due to the rectifying action of anode 14 and during the interval $t_1$ to $t_2$ rotor 17 breaks its circuit. During this time the anode 15 has been electrically isolated from the circuit and been free to float. In general, an isolated conductor in contact with an ionized gas will float at a potential a few tenths of a volt more negative than the potential of the gas in its vicinity. In any case the potential at which the disconnected anode floats is of little consequence since the electrostatic charge that it would hold even at a very high voltage is quite small and represents a negligible amount of energy.

At the time $t=180°$, rotor 18 completes its associated circuit and electron current flows through anode 15 and from 38 to 39 through the right side of the primary. At time $t_3$ current flow ceases due to the rectifying action of anode 15, and during the interval $t_3$ to $t_4$, rotor 18 breaks its circuit. At time $t=360°$, the above described cycle recommences.

As described above, the current flow in the generator, although unidirectional, would appear to be quite discontinuous and the waveform fed into the network would be quite distorted, i.e., contain a lot of high frequency harmonics in addition to the fundamental frequency. Both of these faults can be partly corrected as they are in conventional inverters by providing inductance 35, which serves as a smoothing choke, and the "commutating capacitor" 36, as shown in FIGURE 2. Almost all variation of gross current flow within the generator is eliminated in installations for producing polyphase A.C. power, as will be described below.

It will be understood by those skilled in the art that with the addition of a commutating capacitor of appropriate size, the inversion process will take place as explained above even if the described installation is the only one feeding the power distribution network, i.e., is itself solely responsible for the alternating voltages, A, B appearing at the primary terminals.

In FIGURE 4 is shown a modification of the invention arranged for the generation of polyphase current, specifically 3-phase current. The configuration is generally similar to that shown in FIGURE 2 in that cathode 40 is provided within the MHD generator opposite anodes 41 and 42. A shaft 43, driven by motor 44, is provided. To the shaft are secured a pair of switch rotors 45 and 46. Since the rotors are similar, description of one rotor, such as 45, will be sufficient. It will be noted that the rotor comprises an electrically conductive segment 47 of approximately 60° extent that is in circuit with a conducting web 48 which in turn is secured to a conducting sleeve 49. The sleeve is electrically insulated by bushing 50 from the shaft 43.

Brush 51 is connected by conductor 52 to anode 41. At equally spaced intervals three other brushes 53–55 are provided around the periphery of the rotor. In FIGURE 4, brush 55 is shown in contact with the segment 47 so that current may flow from the anode 41 through rotor 45 to winding 56 of a Y-wound primary, generally designated 57, of transformer 58. The other windings of the primary are connected to brushes 53 and 54 and a common conductor 59 connects the center of the Y winding through inductor 60 to the cathode 40.

A similar primary Y winding is indicated at 61. Each leg of the winding is connected to one of the brushes 62–64, spaced at equal intervals about the periphery of rotor 46. As in the case of rotor 45, one brush indicated at 65, makes constant connection with the sleeve 66 of the rotor 46. Brush 65 is directly connected to anode 42. Both primary Y windings are coupled to a common secondary winding 67.

It will be noted that the brushes 53–55 and 62–64 are intercalated at 60° intervals so that flow of current is alternately established from each of the anodes to one brush of either set at every 60° of shaft rotation. As a result, each leg of each Y winding conducts current once during each rotation of shaft 43, and since the primaries are oppositely wound relative to the secondary 57, a 3-phase alternating current is induced in the secondary.

The curves of FIGURE 5 illustrate the voltage conditions at the ends of the various primary windings, designated 53a–55a and 62a–64a in FIGURE 4. For convenience, the curves of FIGURE 5 are designated 53b–55b and 62b–64b to correspond with the designations of the ends of the primary windings in FIGURE 4. Thus, curve 55b indicates voltage conditions at end 55a of primary winding 56. The generator drives current through rotor 45, brush 55, primary 56 and the conductor 59 during the time that curve 55b is more positive than the generator voltage $-V_g$. After the voltage at 55a drops below $-V_g$ due to voltage conditions of the system supplied by the FIGURE 4 installation, current flow through the primary 56 is terminated because of the rectifying characteristic of its associated anode 41. Thus, as explained with reference to FIGURES 2 and 3, the time interval $t_1$–$t_2$ is available for breaking the circuit with primary winding 56 without danger of arcing at the associated switch rotor 45.

When the shaft rotates to the 60° position ($t=60°$), rotor 46 completes the circuit through brush 63 and its associated primary winding, one end of which is designated 63a. In a manner similar to that just explained, current flows through the circuit during the time that the voltage of 63a, indicated by curve 63b in FIGURE 5, is more positive than the generator voltage $-V_g$.

It will be noted that the curves of FIGURE 5 have been drawn in full and dash lines, each full line curve being drawn in association with a dash line curve which is its mirror image about the abscissa. The associated primary windings serve as a single primary winding, the voltage of the ends of which are indicated by the dash and full line curves. Thus, full line curve 64b and dash line curve 55b, associated with primary windings ending at 64a and 55a, are comparable to the voltage conditions at the opposite ends of a single primary winding.

By virtue of the fact that the circuits associated with the anodes are broken in every instance during a time of no current flow, arcing at the switch segments of the rotors is avoided. This is obviously of great importance particularly in an installation of high power output.

As indicated in FIGURE 4 by reference numerals 67a–67c, capacitors may be connected in parallel with the windings of the transformer secondary for wave shaping purposes. Further, the provision of these capacitors makes it possible to establish the desired voltage conditions of FIGURE 5 even if the FIGURE 4 installation is used as the sole source of power in the system that it is supplying.

In the interest of clarity, a pair of anodes has been shown in FIGURE 2 and FIGURE 4. It should be understood, however, that in practice an MHD generator may include several pairs of anodes arranged opposite a common cathode or arranged opposite a separate cathode provided for each pair of anodes. The anodes may be spaced transverse or longitudinally of the duct. The distance between the anodes should be small relative to the distance between anodes and cathode.

From the foregoing description of the invention, it will be appreciated that the rectifying characteristic of an MHD generator is used in combination with switches to prevent arcing and energy loss in the switches as flow of current is switched to various windings of the primary of an output transformer. This unique use of the characteristic of an HMD generator not only renders a mechanical inversion system feasible, but also makes it possible to use relatively simple switches without danger of contact erosion and without significant energy loss.

For convenience, the use of rotary switches is disclosed. It will be understood by those skilled in the art that any other switches, capable of making and breaking the circuits of the system, may be used if desired.

Having described a preferred embodiment of my invention, I claim:

1. In combination with a magnetohydrodynamic generator having a duct for conveying a stream of electrically conductive gas and having means for establishing magnetic flux through the duct transverse of the direction of gas movement, a cathode and a pair of opposed anodes within the duct with the separation between cathode and anodes normal to the magnetic flux and to the direction of gas movement, a pair of rotary switches and means for driving said switches at constant speed, each switch including a cylindrical rotor having opposed interconnected electrically conductive segments and a pair of brushes for establishing electrical contact with said segments during rotation of said rotor, one brush associated with each rotor being electrically connected individually to one each of said anodes, a transformer primary the ends of which are connected to the remaining brushes associated with said rotors, a conductor interconnecting the midpoint of said transformer primary and said cathode, and a transformer secondary coupled to said transformer primary whereby rotation of said rotors completes alternate electrically conductive paths through said transformer primary for inducing an alternating current in said transformer secondary.

2. In combination with a magnetohydrodynamic generator having a duct for conveying a stream of electrically conductive gas and having means for establishing magnetic flux through the duct transverse of the direction of gas movement, a cathode and a pair of opposed anodes within the duct with their separation normal to the magnetic flux and to the direction of gas movement, a pair of alternately operated switches, one side of each switch being electrically connected to one each of said anodes, a transformer having a primary winding connected to the other sides of said switches and connected at its center to said cathode, and a circuit associated with said switches for driving each of them sequentially to a potential below that of the adjacent gas stream immediately prior to switch opening whereby arcing of said switches is prevented.

3. Apparatus as defined in claim 2 in which said switches comprise rotary switches mounted on a common rotary shaft and said circuit for driving said switches below gas potential comprises a capacitor electrically connected across said transformer primary.

4. A polyphase electric generator installation comprising a magnetohydrodynamic generator having a duct for conveying a stream of electrically conductive gas and having means for establishing magnetic flux through the duct transverse of the direction of gas movement, a cathode and a pair of opposed anodes within the duct with the cathode to anode separation normal to the magnetic flux and to the direction of gas movement, a pair of alternately operated switches, one side of each switch being electrically connected to one each of said anodes at all times, a polyphase transformer including a pair of Y wound primaries, each winding of one of said primaries being connected at equally spaced intervals by one of said switches to one of said anodes, the windings of said other primary being connected at equally spaced intervals through said other switch to said other anode, operation of said switches sequentially establishing electrically conductive paths through each transformer primary, and a multiple wound transformer secondary coupled to said primaries.

5. Apparatus as defined in claim 4 and in addition, a capacitor connected across each winding of said transformer secondary.

6. A polyphase electric generator installation comprising a magnetohydrodynamic generator for generating an electromotive force by relative movement of an electrically conductive gas and a magnetic field, a pair of electrodes within said generator for conveying current under the influence of the generated electromotive force, a pair of alternately operated switches, said switches being electrically connected individually to said electrodes at all times, a pair of multiple wound transformer primaries, the windings of one of said primaries being connected at equally spaced intervals by one of said switches to one of said electrodes, the windings of said other primary being connected at equally spaced intervals by said other switch to said other electrode, operation of said switches sequentially establishing electrically conductive paths through individual windings of each primary to alternate electrodes, and a multiple wound transformer secondary coupled to said primaries.

7. Apparatus as defined in claim 6 and in addition, an electrical circuit for driving each of said switches sequentially to a potential below the generated electromotive force in the gas stream immediately prior to switch opening whereby arcing of said switches is prevented.

8. In combination with a magnetohydrodynamic generator having a duct for conveying a stream of electrically conductive gas and having means for establishing magnetic flux through the duct transverse of the direction of gas movement, a cathode and a plurality of opposed anodes within the duct with the separation between a cathode and anodes normal to the magnetic flux and to the direction of gas movement, a plurality of switches and means for opening and closing said switches at regular intervals, a transformer having primary and secondary windings, said primary windings having outer terminals in circuit with said switches and alternately connected at regular intervals to first one and then another of said anodes by operation of said switches.

9. In combination with a magnetohydrodynamic generator having a duct for conveying a stream of electrically conductive gas and having means for establishing magnetic flux through the duct transverse of the direction of gas movement, a cathode and a pair of opposed anodes in continuous electrical communication with said gas within the duct with their separation positioned normal to the magnetic flux and to the direction of gas movement, an alternating current output circuit connected between said anodes and cathode including a transformer and switching means, said transformer being connected to said cathode and said switching means being connected between said transformer and said anodes, and means for actuating said switching means to alternately connect first one and then another of said anodes through said transformer in circuit with said cathode.

10. Apparatus as defined in claim 9 and in addition circuit means for driving each of said anodes below the potential of the adjacent gas stream immediately prior to the breaking of the circuit associated with said anode.

11. In combination with a magnetohydrodynamic generator having a plurality of anodes, an alternating current output circuit including a transformer and switching means, said switching means being connected to said anodes, and means for actuating said switching means and sequentially breaking first one and then another of the circuits connected to each of said anodes and thereby induce an alternating current in said output circuit.

12. Apparatus as defined in claim 11 and in addition, circuit means for driving each of said anodes to a nonconducting condition immediately prior to the breaking of the circuit associated with said anode.

13. In combination with a magnetohydrodynamic generator for generating an electromotive force by relative movement of an electrically conductive gas and a magnetic flux, electrodes comprising a cathode and a plurality of anodes within the generator for conducting electric current under the influence of the electromotive force, said anodes being in continuous electrical communication with said gas, an alternating current output circuit connected to said electrodes, said output circuit including a transformer having a plurality of portions, said portions, cathode, and anodes comprising separate circuits with the cathode common to each said separate circuit, and means in said output circuit for sequentially breaking first one and then another of the circuits connected to said anodes and thereby induce an alternating current in said output circuit.

14. In combination with a magnetohydrodynamic generator for generating an electromotive force, a plurality of electrodes comprising a cathode and a plurality of anodes within the generator for conveying current under the influence of the electromotive force, said anodes being in continuous electrical communication with said gas, an alternating current output circuit connected to said electrodes, said output circuit including a transformer having a plurality of portions, said portions, cathode, and anodes comprising separate circuits with the cathode common to each said separate circuit, and means in said output circuit for sequentially making and breaking first one and then another of the circuit associated with said anodes and thereby induce an alternating current in said output circuit.

References Cited by the Examiner

UNITED STATES PATENTS

| | | | |
|---|---|---|---|
| 1,531,595 | 3/25 | Chais et al. | 321—50 |
| 1,703,242 | 2/29 | Kukel | 321—50 |
| 1,717,413 | 6/29 | Rudenberg | 310—4 |
| 2,241,050 | 5/41 | Bedford et al. | 321—50 |

FOREIGN PATENTS

| | | |
|---|---|---|
| 841,613 | 6/52 | Germany. |
| 1,161,079 | 3/58 | France. |

LLOYD M. McCOLLUM, *Primary Examiner.*

MILTON O. HIRSHFIELD, *Examiner.*